United States Patent
Collura et al.

(10) Patent No.: US 9,672,045 B2
(45) Date of Patent: Jun. 6, 2017

(54) CHECKPOINTS FOR A SIMULTANEOUS MULTITHREADING PROCESSOR

(71) Applicant: International Business Machines Corporation, Armonk, NY (US)

(72) Inventors: Adam B. Collura, Hopewell Junction, NY (US); Brian R. Prasky, Campbell Hall, NY (US); Anthony Saporito, Highland, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 225 days.

(21) Appl. No.: 14/502,229

(22) Filed: Sep. 30, 2014

(65) Prior Publication Data

US 2016/0092224 A1  Mar. 31, 2016

(51) Int. Cl.
G06F 9/00  (2006.01)
G06F 9/44  (2006.01)
G06F 9/38  (2006.01)

(52) U.S. Cl.
CPC .......... *G06F 9/3851* (2013.01); *G06F 9/3855* (2013.01); *G06F 9/3857* (2013.01); *G06F 9/3863* (2013.01)

(58) Field of Classification Search
None
See application file for complete search history.

(56) References Cited

U.S. PATENT DOCUMENTS

| | | | |
|---|---|---|---|
| 5,655,096 A * | 8/1997 | Branigin | G06F 9/3836 712/200 |
| 5,875,326 A | 2/1999 | Cheong et al. | |
| 6,553,480 B1 * | 4/2003 | Cheong | G06F 9/3836 712/23 |
| 7,409,589 B2 | 8/2008 | Mack et al. | |
| (Continued) | | | |

OTHER PUBLICATIONS

Van Biesbrouck, et al., "Considering All Starting Points for Simultaneous Multithreading Simulation," 2006 IEEE International Symposium on Performance Analysis of Systems and Software, pp. 143-153, IEEE, Mar. 19-21, 2006.

(Continued)

*Primary Examiner* — Michael Sun
(74) *Attorney, Agent, or Firm* — Cantor Colburn LLP; Margaret A. McNamara (57) ABSTRACT

According to an aspect, a system for checkpoint acceleration in a simultaneous multithreading (SMT) processor includes circuitry of a processor core of the SMT processor to execute one or more threads in a processing pipeline. The processing pipeline includes a completion stage followed by a checkpoint stage. The system also includes a checkpoint accelerator disposed between the completion stage and the checkpoint stage. The checkpoint accelerator includes a backlog queue that stores a list of next-to-complete groups of instructions from the one or more threads anticipated to complete in an upcoming cycle. The checkpoint accelerator also includes a selection control that drives one or more of the next-to-complete groups of instructions from the backlog queue to the checkpoint stage based on one or more completion indicators that identify which of the next-to-complete groups of instructions actually completed.

16 Claims, 10 Drawing Sheets

(56) References Cited

U.S. PATENT DOCUMENTS

| | | | | |
|---|---|---|---|---|
| 7,472,258 B2* | 12/2008 | Burky | ................ | G06F 9/30181 |
| | | | | 712/218 |
| 8,645,754 B1* | 2/2014 | Backensto | .......... | G06F 11/1438 |
| | | | | 714/15 |
| 2007/0043934 A1* | 2/2007 | Sodani | ................ | G06F 9/3863 |
| | | | | 712/228 |
| 2009/0327661 A1* | 12/2009 | Sperber | .............. | G06F 9/30098 |
| | | | | 712/217 |
| 2011/0307688 A1 | 12/2011 | Nurvitadhi et al. | | |
| 2014/0122844 A1* | 5/2014 | Swanberg | ............ | G06F 9/3012 |
| | | | | 712/228 |
| 2014/0244985 A1* | 8/2014 | Swanberg | ........... | G06F 9/30098 |
| | | | | 712/228 |

OTHER PUBLICATIONS

U.S. Appl. No. 14/830,804, filed Aug. 20, 2015, Entitled: "Checkpoints for a Simultaneous Multithreading Processor," First Named Inventor: Adam B. Collura.

List of IBM Patents or Patent Applications Treated as Related, Aug. 21, 2015, 2 pages.

\* cited by examiner

CHECKPOINTS FOR A SIMULTANEOUS MULTITHREADING PROCESSOR

BACKGROUND

The present disclosure relates generally to computer processors, and more specifically, to checkpoints for a simultaneous multithreading (SMT) processor cores.

Simultaneous multithreading allows various core resources of a processor to be shared by a plurality of instruction streams known as threads. Core resources can include instruction-execution units, caches, translation-lookaside buffers (TLBs), and the like, which may be collectively referred to generally as a processor core or simply a core. A single thread whose instructions access data may not fully utilize the core resources due to the latency to resolve data located in a memory nest. Multiple threads accessing data sharing a core resource typically result in a higher core utilization and core instruction throughput, but individual threads may experience slower execution. In a super-scalar processor simultaneous multithreading (SMT) implementation, multiple threads may be simultaneously serviced by the core resources of one or more cores. Management of multiple threads can also consume resources, as additional processing cycles may be needed to maintain program order and provide recovery features in case of a fault.

SUMMARY

A system for checkpoint acceleration in a simultaneous multithreading (SMT) processor includes circuitry of a processor core of the SMT processor to execute one or more threads in a processing pipeline. The processing pipeline includes a completion stage followed by a checkpoint stage. The system also includes a checkpoint accelerator disposed between the completion stage and the checkpoint stage. The checkpoint accelerator includes a backlog queue that stores a list of next-to-complete groups of instructions from the one or more threads anticipated to complete in an upcoming cycle. The checkpoint accelerator also includes a selection control that drives one or more of the next-to-complete groups of instructions from the backlog queue to the checkpoint stage based on one or more completion indicators that identify which of the next-to-complete groups of instructions actually completed.

According to an aspect, a method of checkpoint acceleration in an SMT processor includes executing one or more threads in a processing pipeline of a processor core of the SMT processor, where the processing pipeline includes a completion stage followed by a checkpoint stage. A list of next-to-complete groups of instructions from the one or more threads anticipated to complete in an upcoming cycle is stored in a backlog queue. One or more of the next-to-complete groups of instructions are driven from the backlog queue to the checkpoint stage based on one or more completion indicators identifying which of the next-to-complete groups of instructions actually completed.

According to a further aspect, a computer program product for checkpoint acceleration in an SMT processor includes a computer readable storage medium having computer readable program code embodied therewith. The computer readable program code is configured for executing one or more threads in a processing pipeline of a processor core of the SMT processor, where the processing pipeline includes a completion stage followed by a checkpoint stage. The computer readable program code is further configured for storing, in a backlog queue between the completion stage and the checkpoint stage, a list of next-to-complete groups of instructions from the one or more threads anticipated to complete in an upcoming cycle. One or more of the next-to-complete groups of instructions are driven from the backlog queue to the checkpoint stage based on one or more completion indicators identifying which of the next-to-complete groups of instructions actually completed.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Embodiments described herein can be utilized to accelerate a checkpoint process in a processing system. In a simultaneous multithreading (SMT) processor of an SMT environment, each processor core can execute one or more threads, or sequences of instructions, in a substantially parallel manner. Each processor core can employ a processing pipeline, where instructions from each thread are grouped for parallel processing. As one example, a processing pipeline can incorporate a number of units or stages to fetch, decode, dispatch, issue, execute, complete, checkpoint, writeback, transfer, and commit results of the instructions. Instructions can be dispatched in order as groups of instructions but executed out of order where there are no dependencies between the instructions. After execution of instructions reaches completion, checkpointing can store address and/or state information associated with the completed execution such that a recovery point is available in case of a fault, e.g., a subsequent parity error. Writeback can update any registers associated with instruction execution, with results of instruction execution transferred and committed in program order to a destination resource.

Groups of instruction may complete execution at different times depending on the amount of time needed to finish executing all of the instructions in each of the groups. Once tags of one or more completing groups of instructions are known, a storage structure can be accessed to obtain information needed for checkpointing, such as a next sequential instruction address or branch target. The information can then be used to calculate checkpoint information and perform any further processing before checkpointing actually occurs. In exemplary embodiments, rather than waiting until group completion is known, checkpointing is accelerated and the number of cycles needed may be reduced by anticipating the groups of instructions that are next-to-complete (NTC) and temporarily storing information pertaining to them in a backlog queue. The backlog queue can output all NTC information for all possible threads that may complete in a number of upcoming cycles. All possibilities of completion may be anticipated and calculated ahead of time, such that when completion signals arrive they can be used to select an actual completion event from all of the completion events calculated rather than initiating a lookup process for the just-completed group of instructions. The completion signals may also increment a state value to continue anticipating the NTC groups of instructions.

Figure 1:
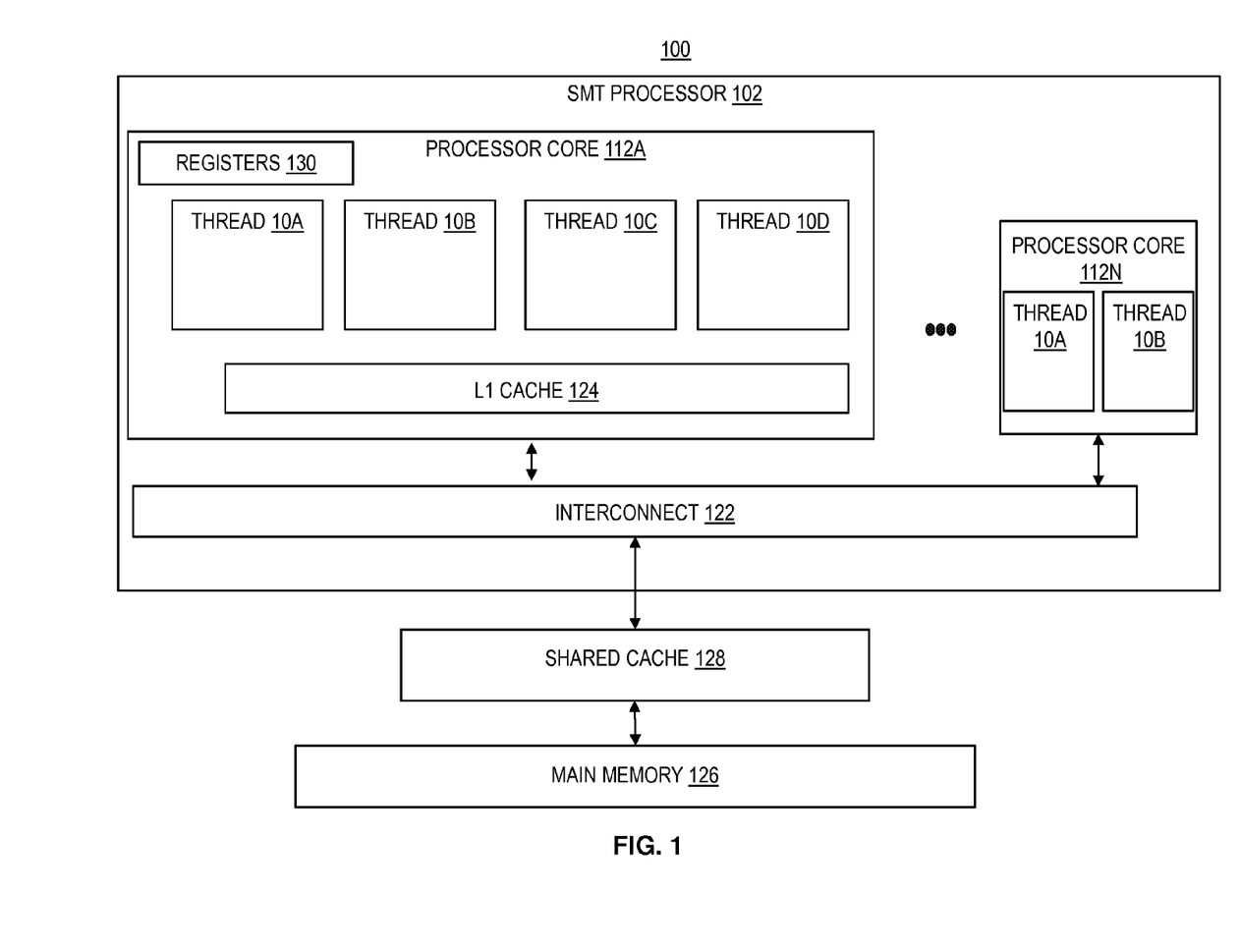
FIG. 1 depicts an example of an SMT multicore environment in accordance with an embodiment.

FIG. 1 depicts an example of an SMT multicore environment 100 according to an embodiment. The SMT multicore environment 100 can include multiple instances of an SMT processor 102. FIG. 1 shows many SMT processor cores 112A through 112N (generally referred to as SMT processor cores 112 or processor cores 112) on one SMT processor die or SMT processor 102, connected with an interconnect 122, under management of an interconnect control (not shown). Each processor core 112 may have an instruction cache for caching instructions from memory to be executed and a data cache for caching data (operands) of memory locations to be operated on by the processor core 112. In an embodiment, caches of multiple SMT processors 102 are interconnected to support cache coherency between the caches of the multiple SMT processors 102. The processor core 112 caches may include one level of caching in a hierarchical cache structure. For example, each SMT processor 102 may employ a shared cache 128 to be shared among all or a subset of the processor cores 112 on the SMT processor 102 between the SMT processor 102 and main memory 126. Additionally, each processor core 112 may have its own L1 cache 124 directly on the processor core 112, where the L1 cache 124 is not shared among the different processor cores 112 but is a core-internal cache. Also, each processor core 112 may have one or more registers 130 for storing small amounts of data, status, and configuration information.

It is understood that the processor cores 112 are physical devices that include all the circuitry (i.e., hardware along with firmware) necessary to execute instructions as understood by one skilled in the art.

Although the SMT processor 102 may include multiple processor cores 112, various examples may be provided with reference to processor core 112A for ease of understanding and not limitation. It is understood that further details shown and discussed relative to processor core 112A apply by analogy to all processor cores 112, and these details may be included in all of the processor cores 112.

The processor core 112A is shown with four threads 10A, 10B, 10C, and 10D (also referred to as thread0, thread1, thread2, and thread3, and generally referred to as thread or threads 10), and each thread 10A-10D includes a separate sequence of instructions or instruction stream, such as a program or portion thereof. Each processor core 112A-112N may be configured to support different levels of SMT, i.e., a different number of threads 10. In the example of FIG. 1, processor core 112A is in SMT-4 mode, meaning that four threads 10A-10D are configured to execute in parallel, while processor core 112N is in SMT-2 mode with threads 10A and 10B. A processor core 112 may be configured in a single thread mode or a higher order mode with a higher number of threads depending upon implementation.

At an architecture level, each thread 10 may represent an independent central processing unit (CPU). Instructions which the thread 10 has for execution by the processor core 112 can include a number of instruction classes, such as: general, decimal, floating-point-support (FPS), binary-floating-point (BFP), decimal-floating-point (DFP), hexadecimal-floating-point (HFP), control, and I/O instructions. The general instructions can be used in performing binary-integer arithmetic operations and logical, branching, and other non-arithmetic operations. The decimal instructions operate on data in decimal format. The BFP, DFP, and HFP instructions operate on data in BFP, DFP, and HFP formats, respectively, while the FPS instructions operate on floating-point data independent of the format or convert from one format to another. To achieve higher throughput, various resource units of each processor core 112 are accessed in parallel by executing one or more of the instructions in a thread 10 using a processing pipeline and through out-of-sequence execution as further described in reference to FIG. 2.

Figure 2:
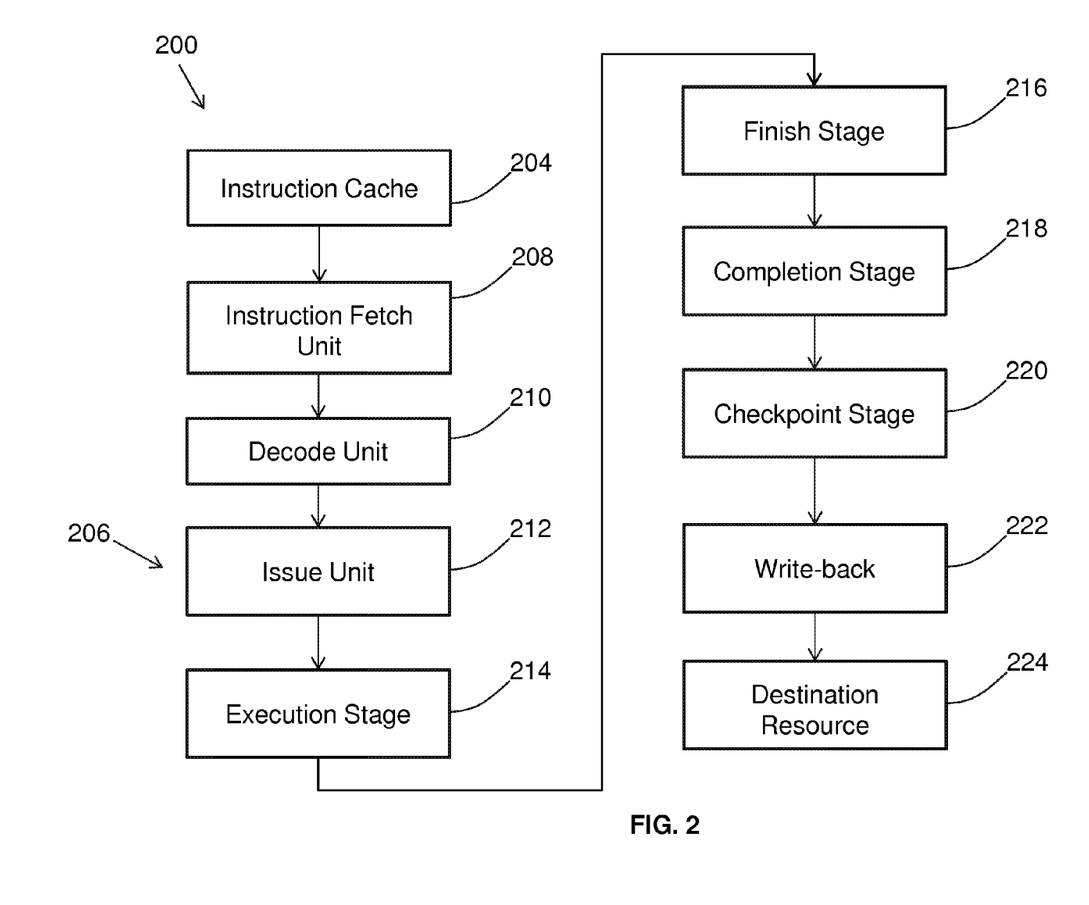
FIG. 2 depicts an example of a portion of processing pipeline of a processor core in accordance with an embodiment.

FIG. 2 depicts an example of a portion of a processing pipeline 206 of a processing sequence 200 of the processor core 112 of FIG. 1 in accordance with an embodiment. An instruction cache 204 may hold a sequence of instructions for one or more of the threads 10 of FIG. 1. An instruction fetch unit 208 may fetch instructions from the instruction cache 204 and provide the fetched instructions to a decode unit 210. The decode unit 210 can decode the instructions and form groups of instructions to be dispatched. Groups of instructions can be tracked in a storage structure, such as a global completion table, as further described herein. The processing pipeline 206 may include out-of-order processing that can be performed on groups of instructions, such as issuing the instructions by an issue unit 212. The issue unit 212 analyzes the instructions or other data and transmits the decoded instructions, portions of instructions, or other data to one or more execution units in an execution stage 214 based on the analysis. The execution stage 214 executes the instructions. The execution stage 214 may include a plurality of execution units, such as fixed-point execution units, floating-point execution units, load/store execution units, and vector execution units.

A finish stage 216 can track finishing execution of individual instructions in groups of instructions. Once all instructions in a group of instructions finishes execution, the group of instructions completes in program order such that older groups in a sequence of instructions complete before a younger group of instructions, as managed by completion stage 218. Upon completion, the completion stage 218 can provide results and instruction information for checkpointing at checkpoint stage 220, as well as release group management resources for reuse. The checkpoint stage 220 can store information to establish a recovery state, such as a next instruction address to execute and various register status values after completion. Write-back logic 222 may write results of instruction execution back to a destination resource 224. The destination resource 224 may be any type of resource, including registers, cache memory, other memory, I/O circuitry to communicate with other devices, other processing circuits, or any other type of destination for executed instructions or data.

The processing pipeline 206 can include other features, such as error checking and handling logic, one or more parallel paths through the processing pipeline 206, and other features known in the art. Multiple forward paths through the processing pipeline 206 may enable multiple threads or multiple instruction groups of a same thread to be executed simultaneously. While a forward path through the processing sequence 200 is depicted in FIG. 2, other feedback and signaling paths may be included between elements of the processing sequence 200.

Figure 3:
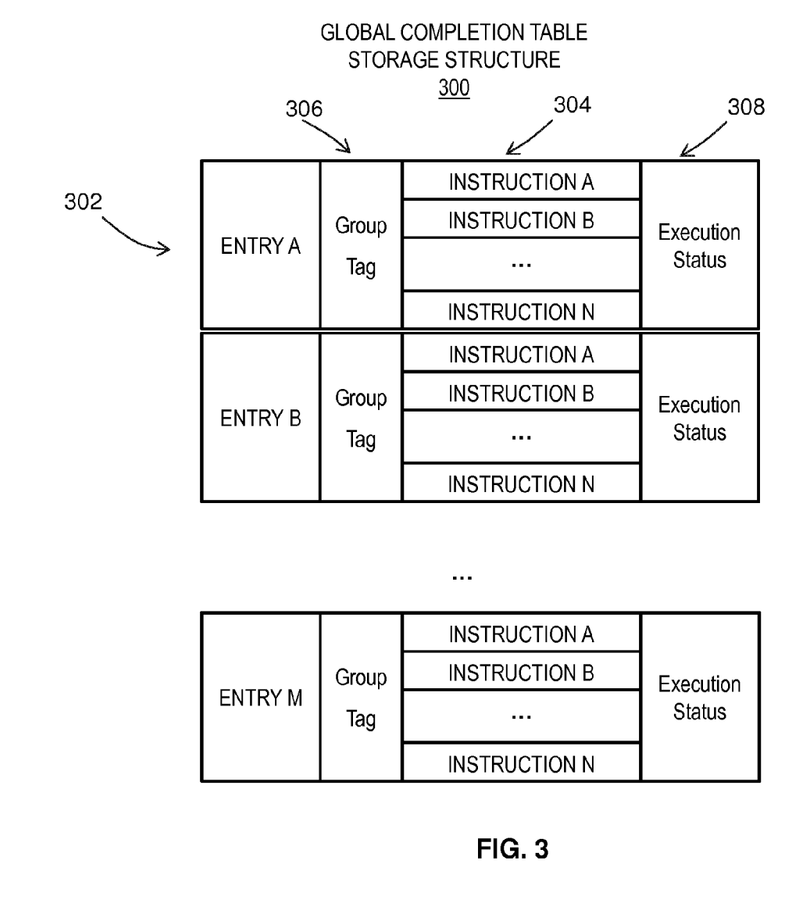
FIG. 3 depicts an example of a storage structure to support instruction completion in accordance with an embodiment.

FIG. 3 depicts a storage structure 300 to support instruction completion in accordance with an embodiment. The storage structure 300 is an example of a global completion table (GCT) that includes a plurality of entries 302, where each of the entries 302 can include tracking data for a group of instructions 304. Each group of instructions 304 may have a group tag 306 or identifier that establishes a link to a particular thread 10 of FIG. 1 and a relative sequence between groups for the same thread 10. The entries 302 need not be populated sequentially, as the group tag 306 can establish sequencing regardless of position within the storage structure 300. The storage structure 300 can also include an execution status 308 that may be defined at a group and/or instruction level. In order for a group of instructions 304 to complete, all of the instructions within the group of instructions 304 must finish. The storage structure may be populated during dispatch by the decode unit 210 of FIG. 2 and updated by the finish stage 216 and completion stage 218 of FIG. 2.

Figure 4:
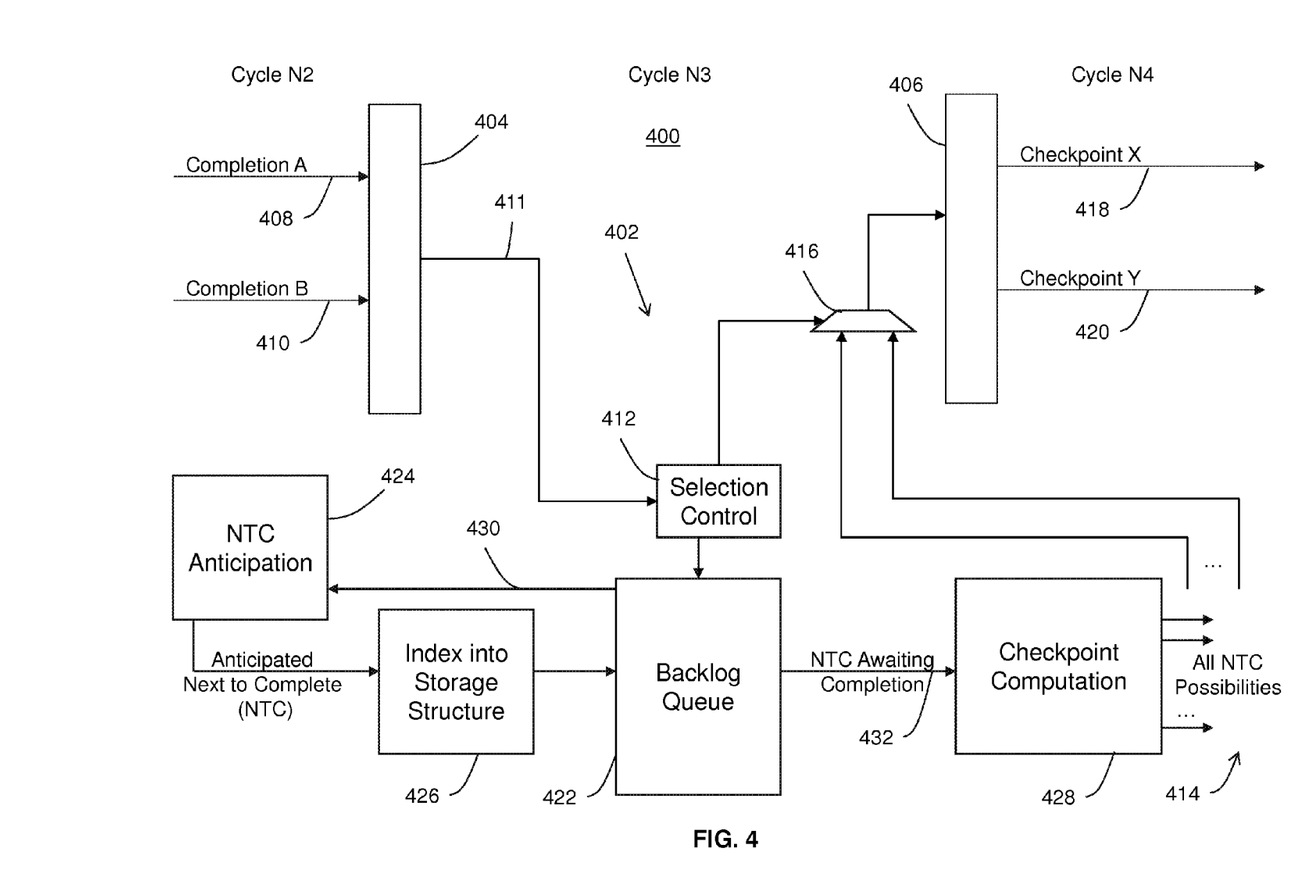
FIG. 4 depicts an example of a checkpoint accelerator in accordance with an embodiment.

FIG. 4 depicts an example of a checkpoint accelerator 402 in accordance with an embodiment in a portion of a processing pipeline 400 that may be embodied in processor core 112 of FIG. 1. The checkpoint accelerator 402 can be disposed between a completion stage 404 and a checkpoint stage 406 of the processing pipeline 400 in a sequential series of cycles. In the example of FIG. 4, the completion stage 404 represents cycle N2, the checkpoint accelerator 402 represents cycle N3, and the checkpoint stage 406 represents cycle N4. The completion stage 404 and checkpoint stage 406 can be embodiments of the completion stage 218 and checkpoint stage 220 of FIG. 2 in an embodiment of the processor core 112 of FIG. 1 that has the capability to complete two groups of instructions simultaneously (completion A 408 and completion B 410). Completion A 408 and completion B 410 can be completion events for any thread 10 in the SMT multicore environment 100 of FIG. 1. For example, in an SMT-2 configuration, it can complete one group for thread0 in a cycle, or one group for thread1 in a cycle, or two groups from either thread0 or thread1 in a cycle, or one group each thread0 and thread1 in a cycle.

In the example of FIG. 4, completion may not be known until cycle N2. At that point, tags of the group or groups completing (e.g., one or more group tag 306 of FIG. 3) are then known and may be used as one or more completion indicators 411 by selection control 412 to select from all NTC possibilities 414 at multiplexer 416 such that checkpoint X 418 and checkpoint Y 420 are available at checkpoint stage 406. Alternatively, tags of the group or groups completing need not be used as completion indicators 411, as the mere fact that thread N had M completion events (e.g., where N can be 0-3 and M is either 1 or 2, 2 only in ST/SMT-2 mode) can provide one or more completion indicators 411. The selection control 412 can also adjust a backlog queue 422 based on the one or more completion indicators 411.

NTC anticipation logic 424 keeps track of all the groups of instructions that are in-flight in the processor core 112 of FIG. 1 for all active threads 10 of FIG. 1. Since instructions must still be completed in program order, the NTC anticipation logic 424 knows the sequential order of groups that are to complete. The NTC anticipation logic 424 can determine which group is anticipated as next to complete and sends that group pointer to index 426 into the storage structure 300 of FIG. 3 and access information pertaining to that group, such as its instruction address, any unique types of instructions within that group, for instance, branches, instruction length codes, whether or not the group is going to redirect program flow (e.g., a branch that resolved taken).

Once the NTC group information is accessed from the storage structure 300 of FIG. 3, it is placed into the backlog queue 422. The backlog queue 422 may stage the next few groups, getting them ready for completion. The information for groups in the backlog queue 422 can be for groups that have not completed yet; these are the NTC groups of instructions in program order as extracted from the storage structure 300 of FIG. 3. Index 426 into the storage structure 300 of FIG. 3 and checkpoint computation logic 428 can have latency. By predetermining a number, e.g., all, NTC possibilities for one or more groups of instructions, the checkpoint accelerator 402 decreases latency effects in the processing pipeline 400, such that the selection control 412 merely needs to select an appropriate value from all of the NTC possibilities 414 that are pre-calculated. Reading NTC information out of the backlog queue 422 is faster than acquiring data using the index 426 into the storage structure 300 of FIG. 3.

The backlog queue 422 may provide feedback 430 to the NTC anticipation logic 424, such as an indicator that the backlog queue 422 is full, stopping additional NTC groups from making progress towards the backlog queue 422 until space frees up. If the backlog queue 422 is not full, the feedback 430 informs the NTC anticipation logic 424 that it can send over another anticipated NTC group.

In an exemplary embodiment, the backlog queue 422 contains several NTC groups and their associated data from the storage structure 300 of FIG. 3 (e.g., next-to-complete (NTC), NTC+1, NTC+2 etc.), but the output of the backlog queue 422 contains just the next-to-complete group's information for all threads as NTC awaiting completion 432. From that information, checkpoint information is calculated for all NTC possibilities for all threads in the checkpoint computation logic 428. This information is on standby as all NTC possibilities 414 until a completion event on completion A 408, completion B 410, or both arrives. Support for the next two NTC groups to complete in a cycle may also be available.

Once a completion A 408 or completion B 410 event occurs, the completion indicators 411 select the appropriate NTC possibility from the multiplexer 416, and feed that to an output latch for the checkpoint stage 406. In addition, the completion indicators 411 can inform the backlog queue 422 that a completion event occurred and how many completion events for a particular thread occurred. This allows draining of an entry or multiple entries from the backlog queue 422, and in turn, can indicate, via feedback 430 to the NTC anticipation logic 424, to send over more NTC information in anticipation of NTC events in the future.

Figure 5:
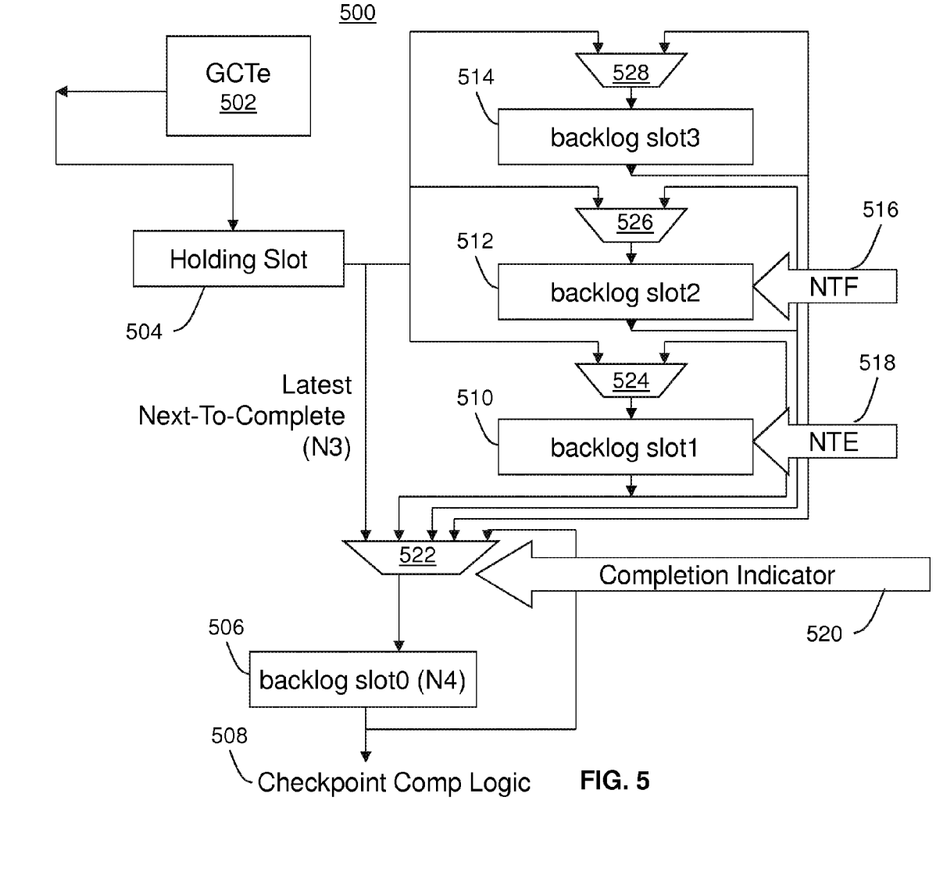
FIG. 5 depicts an example of a backlog queue in accordance with an embodiment.

FIG. 5 depicts an example of a backlog queue 500 in accordance with an embodiment. The backlog queue 500 is an embodiment of the backlog queue 422 of FIG. 4 implemented using a circular buffer. GCT entries (GCTe) 502 from the storage structure 300 of FIG. 3 can be placed into a holding slot latch 504. From the holding slot latch 504, depending on the number of backlog slots available, NTC information will first default to a backlog slot0 latch 506 location for cycle N4, as this is the latch that drives all the checkpoint computation logic 508 in the following cycle that calculates all possibilities of the next-to-complete event, e.g., checkpoint computation logic 428 of FIG. 4. If the backlog slot0 latch 506 is occupied (and waiting for a completion event), the next anticipated NTC entries are placed into the backlog slot1 latch 510, backlog slot2 latch 512, or backlog slot3 latch 514, depending on the values of a next to fill (NTF) pointer 516 and a next to empty (NTE) pointer 518. As completion events occur, the value in backlog slot0 latch 506 is replaced with the next to empty pointer value, be it from backlog slot1 latch 510, backlog slot2 latch 512, or backlog slot3 latch 514. As the backlog slot latches 510-514 start draining, signals can be sent to the NTC anticipation logic 424 of FIG. 4 to allow more data from the GCTe 502 to populate the backlog slot latches 510-514 as needed.

A completion indicator 520 can select a path through multiplexer 522 to update the value of backlog slot0 latch 506. Multiplexers 524, 526, and 528 can be used to select values to store in backlog slot1 latch 510, backlog slot2 latch 512, and backlog slot3 latch 514 respectively and maintain a circular buffer. The NTF pointer 516 and NTE pointer 518 can be used to indicate which latch to fill or empty next depending on the present occupied depth of the backlog queue 500.

Figure 6:
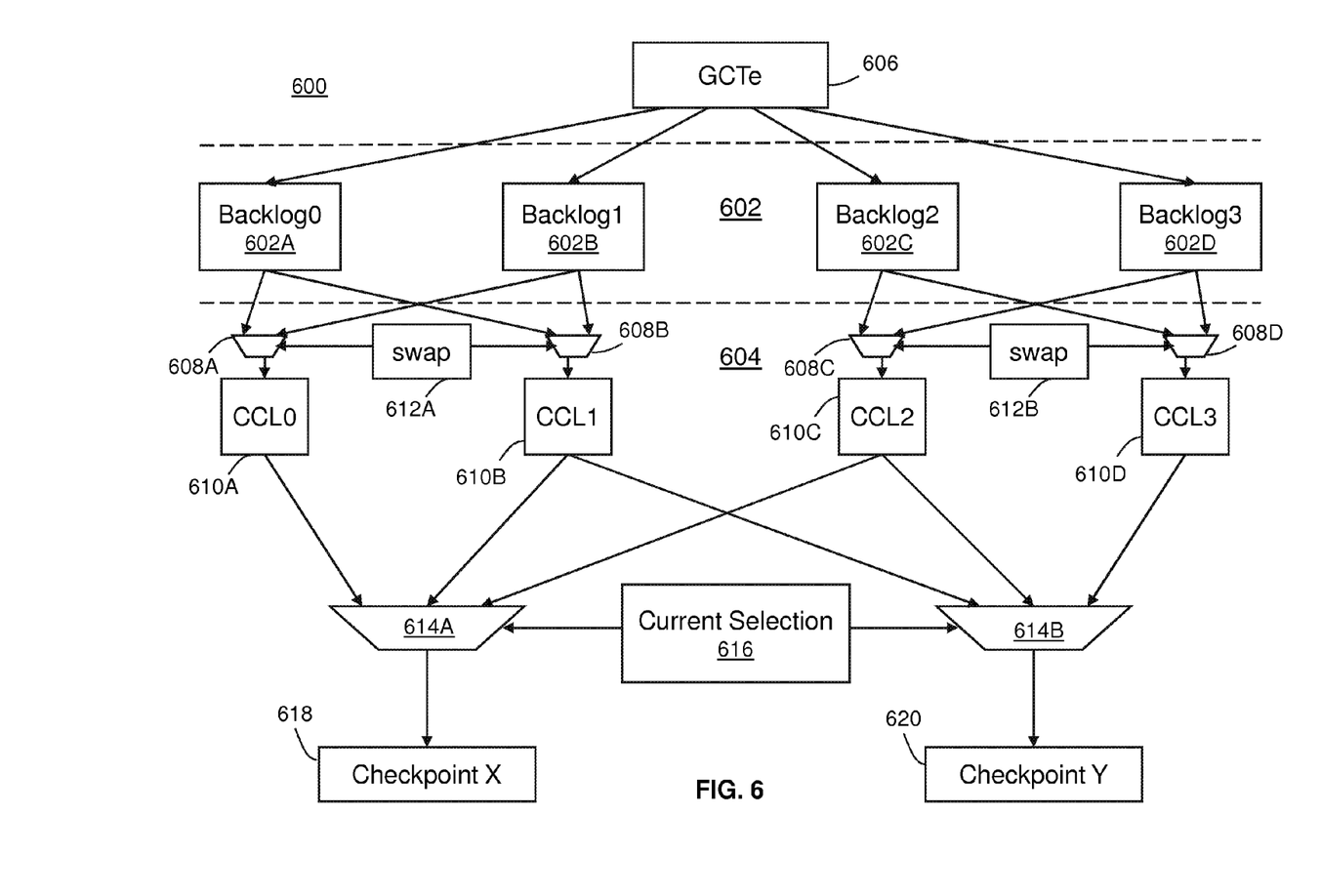
FIG. 6 depicts an example of multiple backlog queues and steering logic in accordance with an embodiment.

FIG. 6 depicts an example of multiple backlog queues 602 and steering logic 604 as dataflow 600 in accordance with an embodiment. In the example of FIG. 6, the backlog queues 602 include backlog0 queue 602A, backlog1 queue 602B, backlog2 queue 602C, and backlog3 queue 602D to handle multiple threads 10 of FIG. 1 in parallel. Thus, there may be a separate instance of the backlog queues 602 for each of the threads 10A-10D of FIG. 1, where the instances of the backlog queue 602 may be combinable based on an SMT mode of operation. The backlog queues 602 may be embodiments of the backlog queue 422 of FIG. 4 and/or backlog queue 500 of FIG. 5. For example, each of the backlog queues 602 may contain an instance of the backlog queue 500 of FIG. 5 within it. The backlog queues 602 are each independent and able to be used for a single thread 10 of FIG. 1. The backlog queues 602 can receive one or more GCT entries (GCTe) 606 from the storage structure 300 of FIG. 3.

The steering logic 604 maintains program order and enables up to two groups of instructions to complete and up to two groups of instructions to checkpoint simultaneously in the processor core 112 of FIG. 1. The steering logic 604 may support multiple SMT modes of operation, such as a single-threaded mode, a two-threaded mode, or a four-threaded mode. In general, the combination of the backlog queues 602 and the steering logic 604 enables dynamic toggling between multiple SMT modes of operation, with control sequences defined for each of the supported SMT modes of operation. It will be understood that the structure of the backlog queues 602 and the steering logic 604 can be further expanded to support higher levels SMT modes of operation, e.g., SMT-8, SMT-16, SMT-32, etc., as well as a greater number of instruction groups and threads in parallel. In the example of FIG. 6, swapping multiplexers 608A, 608B, 608C, and 608D can be used to steer outputs of the backlog queues 602 to checkpoint computation logic 610A, 610B, 610C, and 610D based on swap controllers 612A and 612B. Multiplexers 614A and 614B can be used to select results from the checkpoint computation logic 610A-610D based on a current selection 616. Multiplexer 614A can drive checkpoint X 618 as an embodiment of checkpoint X 418 of FIG. 4, and multiplexer 614B can drive checkpoint Y 620 as an embodiment of checkpoint Y 420 of FIG. 4.

In SMT-4 mode, any of the four threads 10A-10D of FIG. 1 (also referred to as thread0-thread3) can complete next, or any combination of the four threads 10A-10D of FIG. 1 can complete in a given cycle. Each instance of the backlog slot0 latch 506 of FIG. 5 in the backlog queues 602 drives into two of the swapping multiplexers 608, which, in SMT-4 mode, is just a pass-through. The content enters checkpoint computation logic (CCL0) 610A, CCL1 610B, CCL2 610C, or CCL3 610D based on the particular thread, where the checkpoint information is calculated. Checkpoint information is fed into the multiplexers 614A and 614B, which are 3:1 multiplexers in this example. This arrangement ensures that thread0 will always checkpoint on checkpoint X 618, thread1 will checkpoint on checkpoint X 618 if there is no thread0 checkpointing concurrently; otherwise, it will checkpoint on checkpoint Y 620. Thread3 will always checkpoint on checkpoint Y 620, and thread2 will checkpoint on checkpoint Y 620 if there is no thread3 checkpointing concurrently; otherwise, it will checkpoint on checkpoint X 618. Information pertaining to which thread completed is fed into the selection control 412 of FIG. 4 as one or more completion indicators 411 of FIG. 4, which is denoted in FIG. 6 as current selection 616. The current selection 616 selects the appropriate CCL0-CC3 value from the multiplexers 614A and 614B, and places the data into latches for checkpoint X 618 or checkpoint Y 620. At a maximum, only one group can complete per cycle per thread, but two different threads can complete/checkpoint simultaneously in this example.

In SMT-2 mode or single thread mode (i.e., thread0 only), the backlogs queues 602 can be paired up. For thread0, backlog0 queue 602A and backlog1 queue 602B form a pair, and for thread1, backlog2 queue 602C and backlog3 queue 602D form a pair. This allows the capability to complete and thereby checkpoint up to two groups for a single thread per cycle in this example. If one thread0 group completes, it will checkpoint on checkpoint X 618. If two thread0 groups complete, the older group always completes on checkpoint X 618 and the younger group always completes on checkpoint Y 620 in this example. For thread1, one group completing always checkpoints on checkpoint Y 620, and for two thread1 groups completing, the older is always on checkpoint X 618 and the younger is always on checkpoint Y 620 in this example. For one thread0 and one thread1 group to complete, thread0 is always on checkpoint X 618 and thread1 is always on checkpoint Y 620 in this example.

Generally, backlog0 queue 602A and backlog2 queue 602C store even tag information for thread0 and thread1 respectfully, and backlog1 queue 602B and backlog3 queue 602D stores odd tag information for thread0 and thread1 respectfully. The backlogs for thread0 are comprised of backlog0 queue 602A and backlog1 queue 602B. If the NTC is even, the NTC group resides in the backlog slot0 latch 506 of FIG. 5 in backlog0 queue 602A, then the NTC+1 group resides in the backlog slot0 latch 506 of FIG. 5 in backlog1 queue 602B. The swapping multiplexers 608 ensure that values from backlog0 queue 602A go into CCL0 610A (the older of the two completing groups) and values from backlog1 queue 602B go into CCL1 610B (the younger of the two completing groups). If the NTC group is odd, the NTC group resides in the backlog slot0 latch 506 of FIG. 5 of backlog1 queue 602B, then the NTC+1 group resides in the backlog slot0 latch 506 of FIG. 5 of backlog0 queue 602A. The swapping multiplexers 608 perform a swap to ensure that NTC information from backlog1 queue 602B goes into CCL0 610A and NTC+1 information from backlog0 queue 602A goes into CCL1 610B. The ages are preserved, as CCL0 610A is always older than CCL1 610B. This allows for two groups from the same thread to complete and checkpoint simultaneously.

By applying strict checkpointing rules, the steering logic 604 may be simplified, reducing the multiplexing to a 3:1 multiplexer. To achieve these checkpoint rules, a swap mechanism can be employed. In an embodiment, the swap controllers 612A, 612B always point to the backlog that is NTC. For instance, if one group on thread0 completes every cycle, swap controller 612A will first point to backlog0 queue 602A, then to backlog1 queue 602B, back to backlog0 queue 602A, etc. In this example, backlog0 queue 602A only stores even tagged groups for thread0, and backlog1 queue 602B only stores odd tagged groups for thread 0. If two groups for thread0 complete, the pointer of the swap controller 612A remains the same. So if backlog0 queue 602A is NTC, that means backlog1 queue 602B is NTC+1 (i.e., the next group to complete after NTC). Since both of these can complete simultaneously, values from backlog0 queue 602A are routed to CCL0 610A, values from backlog1 queue 602B are routed to CCL1 610B, and if two groups complete, the multiplexers 614A and 614B, via the current selection 616, are set to have checkpoint X 618 choose CCL0 610A and checkpoint Y 620 choose CCL1 610B. If backlog1 queue 602B is NTC and backlog0 queue 602A is NTC+1 and two thread0 groups complete, the swap controller 612A allows data from backlog1 queue 602B to flow into CCL0 610A, and data from backlog0 queue 602A to flow into CCL1 610B. Therefore, CCL0 610A is always older than CCL1 610B, making the final multiplexing simpler in this example.

Figure 7:
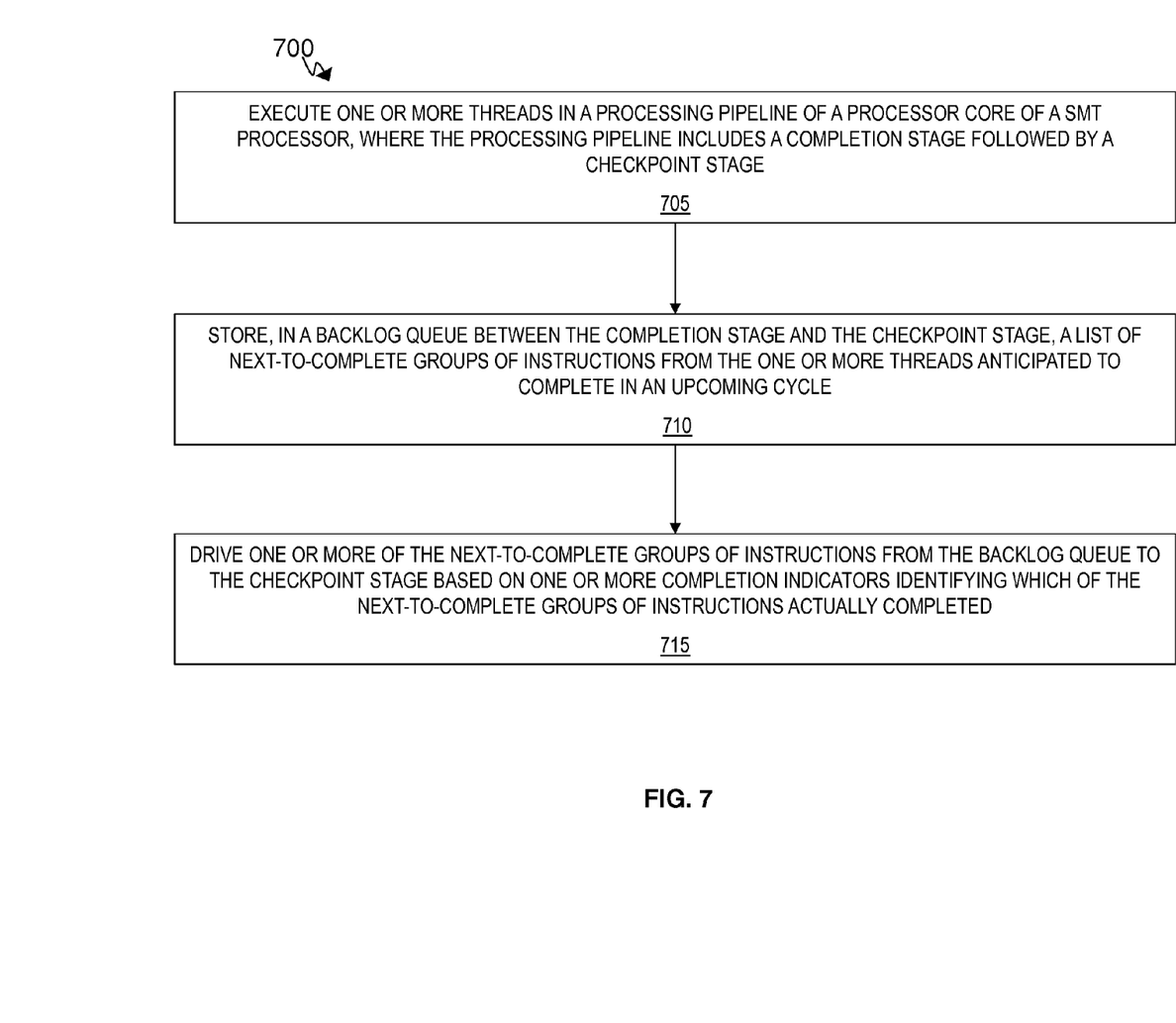
FIG. 7 depicts an example of a process for checkpoint acceleration in accordance with an embodiment.

FIG. 7 depicts an example of a process 700 for checkpoint acceleration in accordance with an embodiment. At block 705, one or more threads are executed in a processing pipeline of a processor core of an SMT processor, such as the SMT processor 102 of FIG. 1. The processing pipeline includes a completion stage followed by a checkpoint stage, such as completion stages 218, 404 and checkpoint stages 220, 406 of FIGS. 2 and 4.

At block 710, a backlog queue disposed between the completion stage and the checkpoint stage stores a list of next-to-complete groups of instructions from the one or more threads anticipated to complete in an upcoming cycle. The backlog queue can be embodied as a single backlog queue 422 of FIG. 4 or multiple backlog queues 602 of FIG. 6. Each backlog queue can be implemented as a circular buffer, such as backlog queue 500 of FIG. 5.

At block 715, one or more of the next-to-complete groups of instructions are driven from the backlog queue to the checkpoint stage based on one or more completion indicators identifying which of the next-to-complete groups of instructions actually completed. This may be performed by the checkpoint accelerator 402 as previously described in reference to FIG. 4. The checkpoint accelerator 402 of FIG. 4 can continue to anticipate the next-to-complete groups of instructions using NTC anticipation logic 424 of FIG. 4 after an instance of the one or more completion indicators 411 of FIG. 4.

Figure 8:
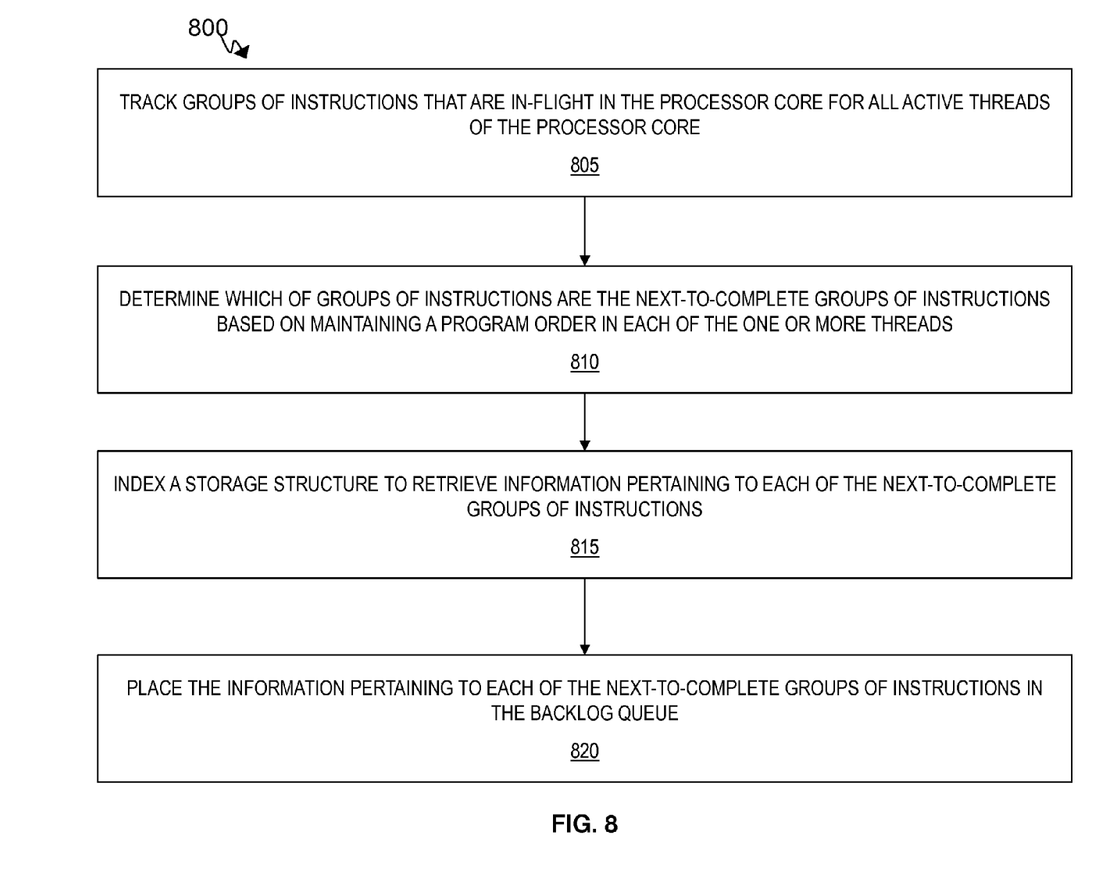
FIG. 8 depicts an example of a process for populating a backlog queue in accordance with an embodiment.

FIG. 8 depicts an example of a process 800 for populating a backlog queue in accordance with an embodiment. At block 805, groups of instructions that are in-flight in a processor core can be tracked for all active threads of the processor core, such as in processor core 112 of FIG. 1. At block 810, it is determined which of the groups of instructions are the next-to-complete groups of instructions based on maintaining a program order in each of the one or more threads. At block 815, a storage structure, such as storage structure 300 of FIG. 3 is indexed to retrieve information pertaining to each of the next-to-complete groups of instructions. At block 820, the information pertaining to each of the next-to-complete groups of instructions is placed in the backlog queue. The backlog queue can stage plurality of the next-to-complete groups of instructions in program order. The backlog queue can be embodied as a single backlog queue 422 of FIG. 4 or multiple backlog queues 602 of FIG. 6. Each backlog queue can be implemented as a circular buffer, such as backlog queue 500 of FIG. 5.

Figure 9:
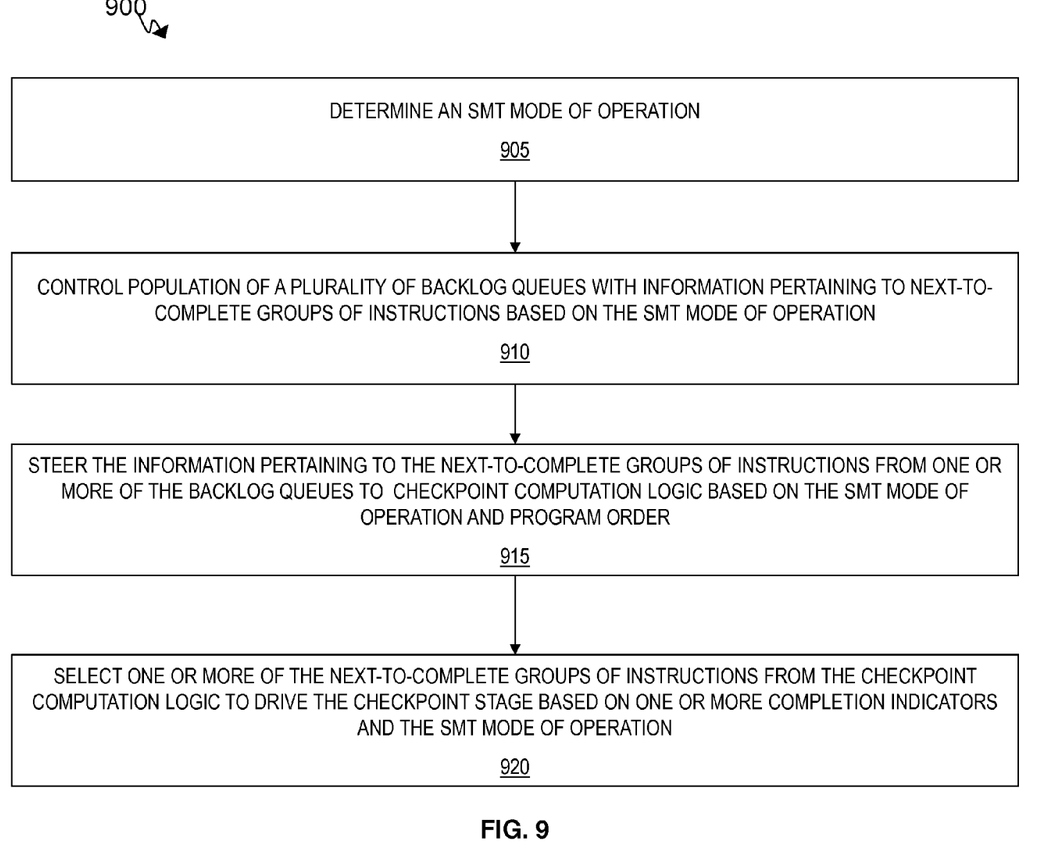
FIG. 9 depicts an example of a process for checkpoint acceleration in accordance with an embodiment.

FIG. 9 depicts an example of a process 900 for checkpoint acceleration in accordance with an embodiment, and with further reference to FIGS. 4 and 6. A separate instance of the backlog queue can be provided for each of the one or more threads, such as in the backlog queues 602 of FIG. 6. At block 905, an SMT mode of operation is determined.

At block 910, population of a plurality of backlog queues 602 of FIG. 6 with information pertaining to the next-to-complete groups of instructions can be controlled based on the SMT mode of operation. As previously described in reference to FIG. 6, mapping of threads to specific backlog queues 602 can be based on SMT mode and sequencing of groups of instructions, e.g., older vs. younger.

At block 915, the information pertaining to the next-to-complete groups of instructions can be steered by steering logic 604 of FIG. 6 from one of more of the backlog queues 602 of FIG. 6 to checkpoint computation logic (CCL0-CCL3 610A-610D of FIG. 6) based on the SMT mode of operation and program order. At block 920, one or more of the next-to-complete groups of instructions can be selected from the checkpoint computation logic to drive the checkpoint stage 406 of FIG. 4 based on one or more completion indicators 411 of FIG. 4 and the SMT mode of operation.

For example, the steering logic 604 of FIG. 6 can be used to maintain program order and enable up to two of the groups of instructions to complete and up to two of the groups of instructions to checkpoint simultaneously in the processor core 112 of FIG. 1. The steering logic 604 of FIG. 6 may be further expanded to enable more than two groups of instructions to complete and more than two groups of instructions to checkpoint simultaneously. The steering logic 604 of FIG. 6 may support a number of operating modes, such as a single-threaded mode of operation and a two-threaded mode of operation with up to two of the groups of instructions of a same thread completing and checkpointing simultaneously in the processor core 112 of FIG. 1, and a four-threaded mode of operation with up to two of the groups of instructions of different threads completing and checkpointing simultaneously in the processor core 112 of FIG. 1. The steering logic 604 of FIG. 6 can be further expanded to support an eight-threaded mode, a sixteen-threaded mode, a thirty-two-threaded mode, and higher SMT modes of operation including various instruction group sizes and the ability to toggle between the supported SMT modes of operation.

Figure 10:
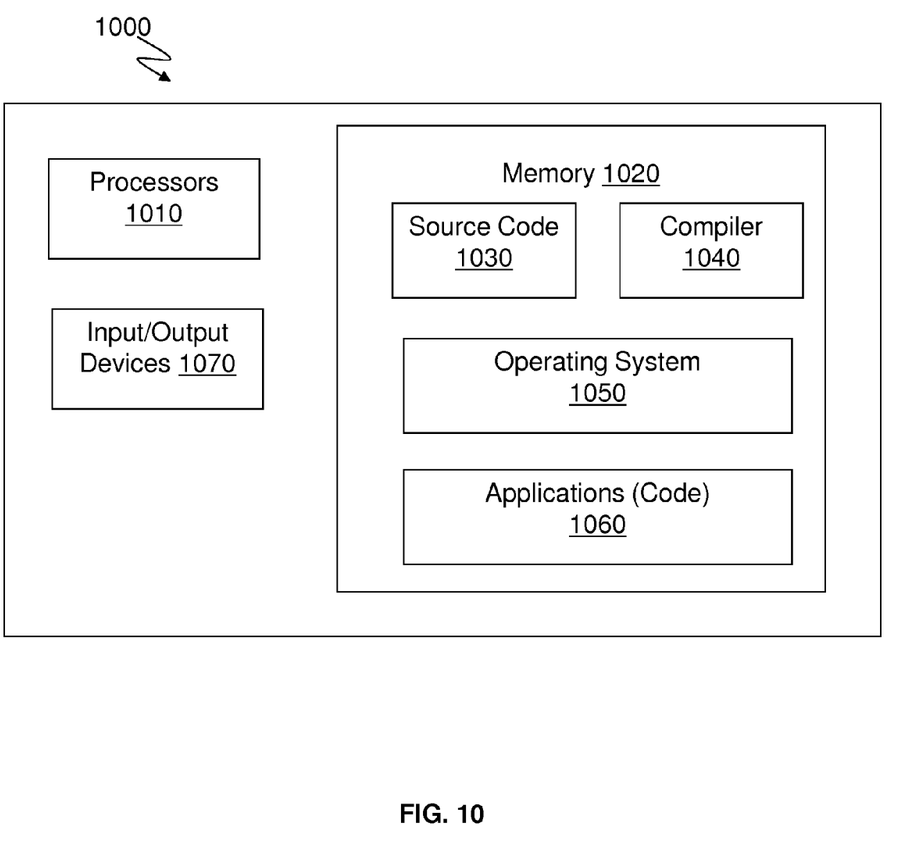
FIG. 10 depicts an example computer that can implement features discussed herein.

FIG. 10 illustrates an example computer 1000 (e.g., which includes the various processor cores (circuits) 112A-112N of the SMT processor 102 of FIG. 1 as discussed herein) that can implement features discussed herein. The computer 1000 may be a distributed computer system over more than one computer. Various methods, procedures, modules, flow diagrams, tools, applications, circuits, elements, and techniques discussed herein may also incorporate and/or utilize the capabilities of the computer 1000. Indeed, capabilities of the computer 1000 may be utilized to implement and execute features of exemplary embodiments discussed herein.

Generally, in terms of hardware architecture, the computer 1000 may include one or more processors 1010 (i.e., SMT processor 102 with processor cores 112A-112N of FIG. 1), computer readable storage memory 1020, and one or more input and/or output (I/O) devices 1070 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The processor 1010 is a hardware device for executing software that can be stored in the memory 1020, where the processor 1010 is an embodiment of the SMT processor 102 of FIG. 1. The computer readable memory 1020 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Note that the memory 1020 can have a distributed architecture, where various components are situated remote from one another, but can be accessed by the processor(s) 1010.

The software in the computer readable memory 1020 may include one or more separate programs, each of which comprises an ordered listing of executable instructions for implementing logical functions. The software in the memory 1020 includes one or more suitable operating system (O/S) 1050, compiler 1040, source code 1030, and one or more applications 1060 that utilize exemplary embodiments. As illustrated, the application 1060 comprises numerous functional components for implementing the features, processes, methods, functions, and operations of the exemplary embodiments.

The operating system 1050 may control the execution of other computer programs, and provides scheduling, input-output control, file and data management, memory management, and communication control and related services.

The software application 1060 may be a source program, executable program (object code), script, or any other entity comprising a set of instructions to be performed. When a source program, then the program is usually translated via a compiler (such as the compiler 1040), assembler, interpreter, or the like, which may or may not be included within the memory 1020, so as to operate properly in connection with the O/S 1050. Furthermore, the application 1060 can be written as (a) an object oriented programming language, which has classes of data and methods, or (b) a procedure programming language, which has routines, subroutines, and/or functions.

The I/O devices 1070 may include input devices (or peripherals) such as, for example but not limited to, a mouse, keyboard, scanner, microphone, camera, etc. Furthermore, the I/O devices 1070 may also include output devices (or peripherals), for example but not limited to, a printer, display, etc. Finally, the I/O devices 1070 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 1070 also include components for communicating over various networks, such as the Internet or an intranet. The I/O devices 1070 may be connected to and/or communicate with the processor 1010 utilizing Bluetooth connections and cables (via, e.g., Universal Serial Bus (USB) ports, serial ports, parallel ports, FireWire, HDMI (High-Definition Multimedia Interface), etc.).

Technical effects and benefits include checkpoint acceleration in an SMT processor by anticipating next-to-complete groups of instructions and pre-calculation of checkpoint values before receiving an indication of completion. A common design can be implemented to support a checkpoint accelerator for a variety of SMT modes of operation, such as SMT-4, SMT-2, and single threaded operation.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for checkpoint acceleration in a simultaneous multithreading (SMT) processor, the system comprising:
    circuitry of a processor core of the SMT processor to execute one or more threads comprising in a processing pipeline comprising an instruction fetch unit followed by a completion stage followed by a checkpoint stage, the checkpoint stage storing information to establish a recovery state comprising a next instruction address to execute after encountering a fault; and
    a checkpoint accelerator disposed between the completion stage and the checkpoint stage, the checkpoint accelerator comprising a backlog queue that stores a list of next-to-complete groups of instructions from the one or more threads anticipated to complete in an upcoming cycle and a selection control that drives one or more of the next-to-complete groups of instructions from the backlog queue to the checkpoint stage based on one or more completion indicators that identify which of next-to-complete groups of instructions actually completed.

2. The system of claim 1, wherein the checkpoint accelerator continues anticipating the next-to-complete groups of instructions after an instance of the one or more completion indicators.

3. The system of claim 1, further comprising:
next-to-complete anticipation logic that tracks groups of instructions that are in-flight in the processor core for all active threads of the processor core.

4. The system of claim 3, wherein the next-to-complete anticipation logic determines which of the groups of instructions are the next-to-complete groups of instructions based on maintaining a program order in each of the one or more threads.

5. The system of claim 4, wherein the checkpoint accelerator indexes a storage structure to retrieve information pertaining to each of the next-to-complete groups of instructions and places the information pertaining to each of the next-to-complete groups of instructions in the backlog queue.

6. The system of claim 5, wherein the backlog queue stages a plurality of the next-to-complete groups of instructions in program order.

7. The system of claim 1, further comprising a separate instance of the backlog queue for each of the one or more threads, wherein the instances of the backlog queue are combinable based on an SMT mode of operation.

8. The system of claim 1, further comprising steering logic that maintains program order and enables multiple groups of instructions to complete and multiple groups of instructions to checkpoint simultaneously in the processor core for the one or more threads.

9. The system of claim 8, wherein the steering logic supports: a single-threaded mode of operation and a two-threaded mode of operation with up to two of the groups of instructions of a same thread completing and checkpointing simultaneously in the processor core, and a four-threaded mode of operation with up to two of the groups of instructions of different threads completing and checkpointing simultaneously in the processor core, the checkpointing comprising storing address and/or state information associated with completed execution to provide the recovery state.

10. A computer program product for checkpoint acceleration in a simultaneous multithreading (SMT) processor, the computer program product comprising:
a computer readable storage medium having computer readable program code embodied therewith, the computer readable program code comprising:
computer readable program code configured for:
executing one or more threads in a processing pipeline of a processor core of the SMT processor, the processing pipeline comprising an instruction fetch unit followed by a completion stage followed by a checkpoint stage, the checkpoint stage storing information to establish a recovery state comprising a next instruction address to execute after encountering a fault;
storing, in a backlog queue between the completion stage and the checkpoint stage, a list of next-to-complete groups of instructions from the one or more threads anticipated to complete in an upcoming cycle; and
driving one or more of the next-to-complete groups of instructions from the backlog queue to the checkpoint stage based on one or more completion indicators identifying which of the next-to-complete groups of instructions actually completed.

11. The computer program product of claim 10, further comprising:
tracking groups of instructions that are in-flight in the processor core for all active threads of the processor core;
determining which of the groups of instructions are the next-to-complete groups of instructions based on maintaining a program order in each of the one or more threads;
indexing a storage structure to retrieve information pertaining to each of the next-to-complete groups of instructions; and
placing the information pertaining to each of the next-to-complete groups of instructions in the backlog queue.

12. The computer program product of claim 11, wherein the backlog queue stages a plurality of the next-to-complete groups of instructions in program order.

13. The computer program product of claim 10, further comprising:
continuing to anticipate the next-to-complete groups of instructions after an instance of the one or more completion indicators.

14. The computer program product of claim 10, wherein a separate instance of the backlog queue is provided for each of the one or more threads, wherein the instances of the backlog queue are combinable based on an SMT mode of operation.

15. The computer program product of claim 10, further comprising:
using steering logic to maintain program order and enable multiple groups of instructions to complete and multiple groups of instructions to checkpoint simultaneously in the processor core for the one or more threads.

16. The computer program product of claim 15, wherein the steering logic supports: a single-threaded mode of operation and a two-threaded mode of operation with up to two of the groups of instructions of a same thread completing and checkpointing simultaneously in the processor core, and a four-threaded mode of operation with up to two of the groups of instructions of different threads completing and checkpointing simultaneously in the processor core, the checkpointing comprising storing address and/or state information associated with completed execution to provide the recovery state.

* * * * *